US010341823B2

(12) United States Patent
Vempati et al.

(10) Patent No.: US 10,341,823 B2
(45) Date of Patent: Jul. 2, 2019

(54) SYSTEM AND METHOD FOR DIRECT MODE PUSH TO TALK COMMUNICATION PROTOCOLS

(71) Applicant: Kodiak Networks, Inc., Plano, TX (US)

(72) Inventors: Brahmananda R Vempati, Dallas, TX (US); Ramu Kandula, Plano, TX (US)

(73) Assignee: KODIAK NETWORKS INC., Plano, TX (US)

( * ) Notice: Subject to any disclaimer, the term of this patent is extended or adjusted under 35 U.S.C. 154(b) by 0 days.

(21) Appl. No.: 15/856,832

(22) Filed: Dec. 28, 2017

(65) Prior Publication Data
US 2018/0192258 A1      Jul. 5, 2018

Related U.S. Application Data

(60) Provisional application No. 62/440,699, filed on Dec. 30, 2016.

(51) Int. Cl.
*H04W 4/10*      (2009.01)
*H04W 4/08*      (2009.01)
(Continued)

(52) U.S. Cl.
CPC .............. *H04W 4/10* (2013.01); *H04W 4/08* (2013.01); *H04W 8/005* (2013.01); *H04W 88/04* (2013.01)

(58) Field of Classification Search
CPC ..... H04W 76/14; H04W 8/005; H04W 88/04; H04W 4/01; H04W 4/08; H04W 76/45; H04W 92/18; H04W 28/08; H04W 48/16
See application file for complete search history.

(56) References Cited

U.S. PATENT DOCUMENTS 3,912,874 A   10/1975   Botterell et al.
4,796,293 A   1/1989    Blinken et al.
(Continued)

FOREIGN PATENT DOCUMENTS

GB      2338150 A     3/1998
JP      200392776 A   10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Keith Ferguson

(57) ABSTRACT

An embodiment method includes discovering, by a user equipment (UE), a plurality of UE-to-Network relays available to the first UE. The UE is located outside a coverage area of a wireless communications network. The method includes receiving, by the first UE, one or more capacity indications from the plurality of UE-to-Network relays and selecting, by the first UE, a first UE-to-Network relay from the plurality of UE-to-Network relays to connect to the wireless communications network in accordance with a relay selection policy and the one or more capacity indications. The method includes connecting, by the first UE, to the first UE-to-Network relay using direct mode communications.

19 Claims, 10 Drawing Sheets

(51) Int. Cl.
*H04W 8/00* (2009.01)
*H04W 88/04* (2009.01)

(56) References Cited

U.S. PATENT DOCUMENTS

| | | |
|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |

(56) References Cited

U.S. PATENT DOCUMENTS

| | | |
|---|---|---|
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0148210 A1 | 5/2014 | Kundu et al. |
| 2016/0262086 A1* | 9/2016 | Bodas ............... H04B 7/15 |
| 2016/0285539 A1* | 9/2016 | Sadiq ................ H04W 8/005 |
| 2017/0013653 A1* | 1/2017 | Suzuki ............... H04W 24/04 |
| 2017/0027009 A1* | 1/2017 | Dumpala ........... H04B 7/15507 |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", trackwell.com, Oct. 2002, pp. 1-1.

* cited by examiner

SYSTEM AND METHOD FOR DIRECT MODE PUSH TO TALK COMMUNICATION PROTOCOLS

CROSS-REFERENCE TO RELATED APPLICATIONS

The present application is related to and claims benefit under 35 U.S.C. § 119(e) from U.S. Provisional Patent Application Ser. No. 62/440,699, the entire contents of which being incorporated herein by reference.

BACKGROUND OF THE INVENTION

Push-to-talk (PTT) platforms involve providing PTT functionality (e.g., call group management, call origination, call transmittal, talk-back call termination, floor management, filtering, etc.) through PTT clients on client devices. The client devices may be referred to generally as user equipment (UE). The PTT functions may be performed by one or more servers, and communications between the client devices and the servers may be performed over a telecommunications network (e.g., a carrier network).

In some situations, particularly when one or more of the client devices are located outside a coverage area of a telecommunications network, direct mode communications may be used for the client devices to participate in PTT functions. For example, a first client device may use direct mode communications to communicate with a second client device (referred to as a relay), which bridges the first client device to a telecommunications network and/or other client devices. Various mechanisms for enabling client devices to act as relays using direct mode communications are defined in a Mission Critical Push-to-Talk (MCPTT) standard by the Third Generation Partnership Project (3GPP). However, gaps in the standard exist in how to handle multiple relays within range of a single client device, improving signaling efficiencies for group communications between a plurality of client devices and a relay, extending the range of relays, and the like.

Accordingly, there is a need for a systems and methods for direct mode PTT communication protocols.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
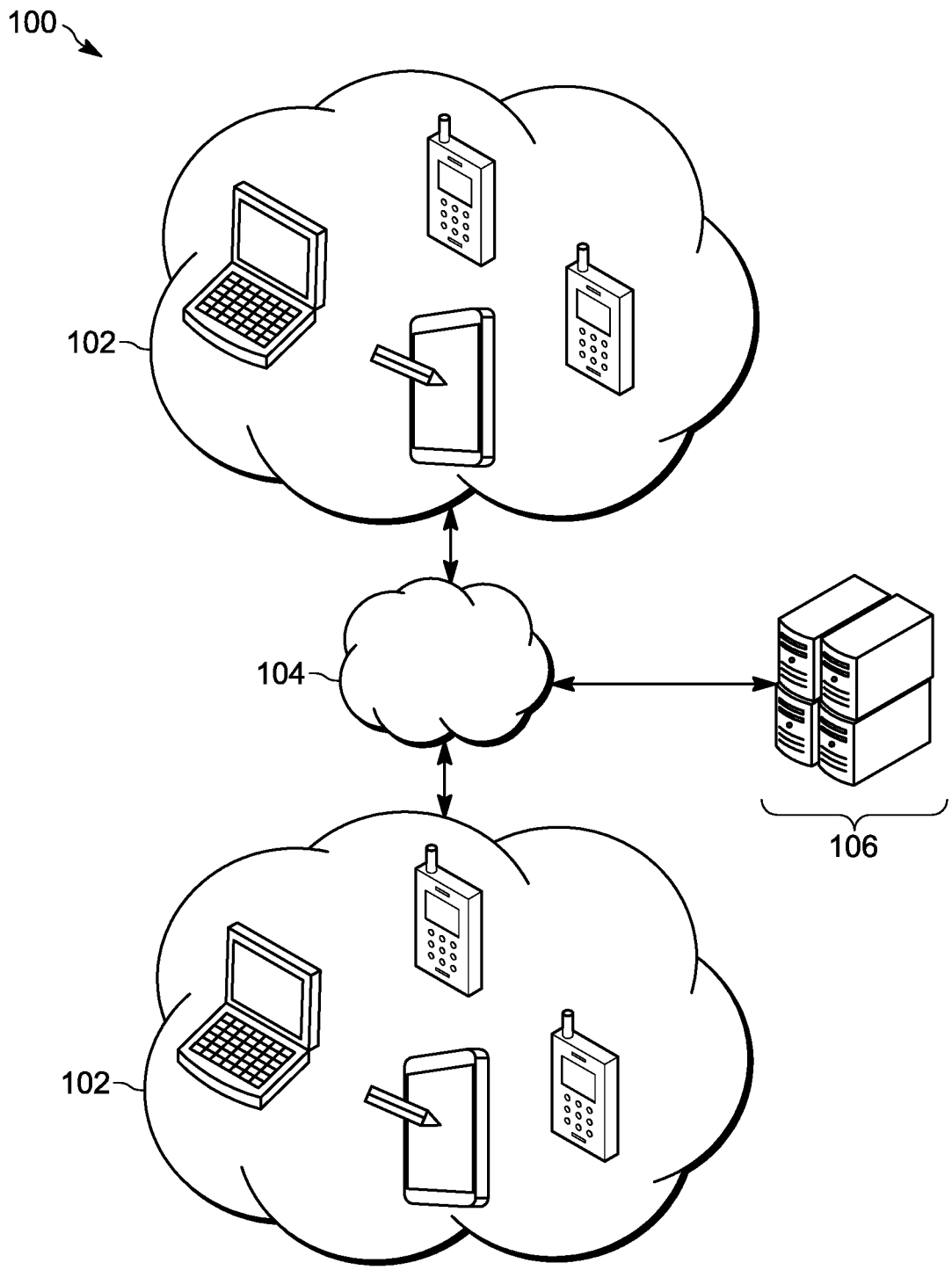
FIG. 1 is a block diagram of a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with an embodiment, a method includes discovering, by a first user equipment (UE), a plurality of UE-to-Network relays available to the first UE. The first UE is located outside a coverage area of a wireless communications network. The method further includes receiving, by the first UE, one or more capacity indications from the plurality of UE-to-Network relays and selecting, by the first UE, a first UE-to-Network relay from the plurality of UE-to-Network relays to connect to the wireless communications network in accordance with a relay selection policy and the one or more capacity indications. The method further includes connecting, by the first UE, to the first UE-to-Network relay using direct mode communications. The first UE-to-Network relay connects the first UE to the wireless communications network for the first UE to access a Push-to-talk (PTT) service.

In accordance with an embodiment, a method includes participating, by a relay, in a first group communications session with a first plurality of UEs in a first region. The first group communications session uses a multicast based off-network group call protocol over proximity based services (ProSe). The method further includes bridging, by the relay, the first plurality of UEs with a second UE for the first plurality of UEs to participate in Push-to-Talk (PTT) group communications with the second UE. The second UE is located in a second region different from the first region. The method further includes conveying, by the relay, signaling flows for the PTT group communications from the second UE to the first plurality of UEs through the first group communications session.

In accordance with an embodiment, a method includes discovering, by a first user equipment (UE)-to-UE relay, a second relay in a first coverage area of the first UE-to-UE relay. The first coverage area corresponds to a coverage range of direct mode communications with the first UE-to-UE relay. The method further includes providing, by the first UE-to-UE relay, a Push-to-Talk (PTT) service to a first UE in the first coverage area through the second relay. The first UE is connected to first UE-to-UE relay using direct mode communications. The PTT service includes a communications session between the first UE and a second UE, and the second UE is located outside of the first coverage area.

Various embodiments are described within a specific context, namely, to a push to talk (PTT) platform providing PTT services in accordance a mission critical push to talk (MCPTT) standard as defined by the third generation partnership project (3GPP). Various embodiments may, however, be applied to other systems and networks, including mission critical data (MCData) services, mission critical video (MCVideo) services, and the like.

FIG. 1 illustrates a communications system 100, which provides an architecture for supporting a PTT communications solution in accordance with some embodiments. Communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Throughout the description "client device" may be used interchangeably with UE, and the term UE is understood to encompass all the above devices. Applications (referred to hereinafter as "PTT clients") reside on client devices 102 for accessing various PTT functions (also referred to as services) provided by PTT platform 106.

Client devices 102 may communicate with PTT platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, 3GPP, 3GPP MCPTT, etc. In some embodiments, network 104 may comprise various other devices, such as relays, low power nodes, etc. Network 104 may further include backhaul network components, such as various gateways, routers, controllers, schedulers, and the like.

In an embodiment where PTT platform 106 is a PTT-over-Cellular (PoC) platform, subscribers to a PTT solution (e.g., users operating client devices 102) may be provisioned onto system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

In some embodiments, the PTT platform 106 may support MCPTT as defined by 3GPP. For example, direct mode UE-to-UE communication and UE-to-Network communications for MCPTT is defined in the 3GPP Release 13 specification, the 3GPP Release 14 specification, and the like. In some embodiments, PTT platform 106 may provide services in accordance with these standards.

For example, client devices (e.g., similar to client devices 102) may be located outside a coverage area of network 104 and may not have access to a direct connection to network 104. These client devices may be referred to as off-network client devices or off-network UEs (e.g., off-network UEs 202 in FIG. 2). In such embodiments, the off-network client devices may be connected to network 104 indirectly through a UE-to-Network relay (e.g., UE-to-Network relays 204a/204b in FIG. 2). The UE-to-Network relay may itself be a client device (e.g., any device capable of establishing a connection with a communications network, such as a UE, STA, a cellular phone, a tablet, a laptop, and other wired/wirelessly enabled devices) with a PTT client residing thereon to access various PTT functions. The off-network client device may communicate with the UE-to-Network relay using direct mode communications, such as proximity based services (ProSe), WiFi direct, Project 25 (P25) direct mode, combinations thereof, or the like.

As another example, a first off-network client device may be engaged in a 1-1 PTT service or a group PTT service with a second off-network client device through a UE-to-UE relay when the second off-network client device is outside a coverage range of direct mode communications of the first off-network client device. The UE-to-UE relay may itself be a client device (e.g., any device capable of establishing a connection with a communications network, such as a UE, STA, a cellular phone, a tablet, a laptop, and other wired/wirelessly enabled devices) with a PTT client residing thereon to access various PTT functions. Both the first off-network client device and the second off-network client device may communicate with the UE-to-UE relay using direct mode communications, such as ProSe, WiFi Direct, P25 direct mode, combinations thereof, or the like.

Various direct mode operation functionalities related to private MCPTT calls, group MCPTT calls, and service continuity are addressed by the 3GPP specifications. However, additional enhancements (e.g., beyond the definitions found in the 3GPP specifications) for the capabilities MCPTT service(s), improving the user experience in off-network mode, and optimizing the off-network mode communication protocols may still be desired. In particular, various embodiments may address one or more of the following non-limiting concepts: effectively utilizing multiple UE-to-Network relays within a coverage area of a UE; connecting off-network members of a group to the on-network members of the group using a group-bridge on a UE-to-Network relay to provide PTT services (e.g., avoiding the need to connect all of the off-network members of the group individually using separate streams through the UE-to-network relay); connecting a group split across two adjacent regions through a UE-to-UE relay to provide PTT services; extending coverage range using multi-hop UE-to-UE relays to connect remote users to a UE-to-Network relay to provide PTT services; and concurrently using direct mode and on-network communications to provide PTT services.

In some embodiments, PTT platform 106 uses container technology for virtualization of a PTT system architecture, such as, the virtualization of provided PTT services. Example container technologies may include Docker, Rocket, LXD, and the like although the architecture is not limited to a specific container technology. Virtualization using container technology may allow PTT platform 106 to adopt a micro-services model in which service clusters are considered the building blocks of the system architecture. For example, each function provided by PTT platform 106 may be virtualized in a unique service cluster, and each service cluster may perform a different function in PTT platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT platform 106 incorporates distributed databases, clustering technologies, data analytics tools, and messaging middleware to provide a robust, scalable platform. PTT platform 106 may use fully virtualized components with a layered approach to service orchestration, which allows PTT platform 106 to be integrated into various cloud environments, such as a carrier's private cloud infrastructure, a dedicated PTT cloud infrastructure, combinations thereof, and the like. Other telecommunication services platforms, including other PTT platforms, may be used in other embodiments.

Figure 2:
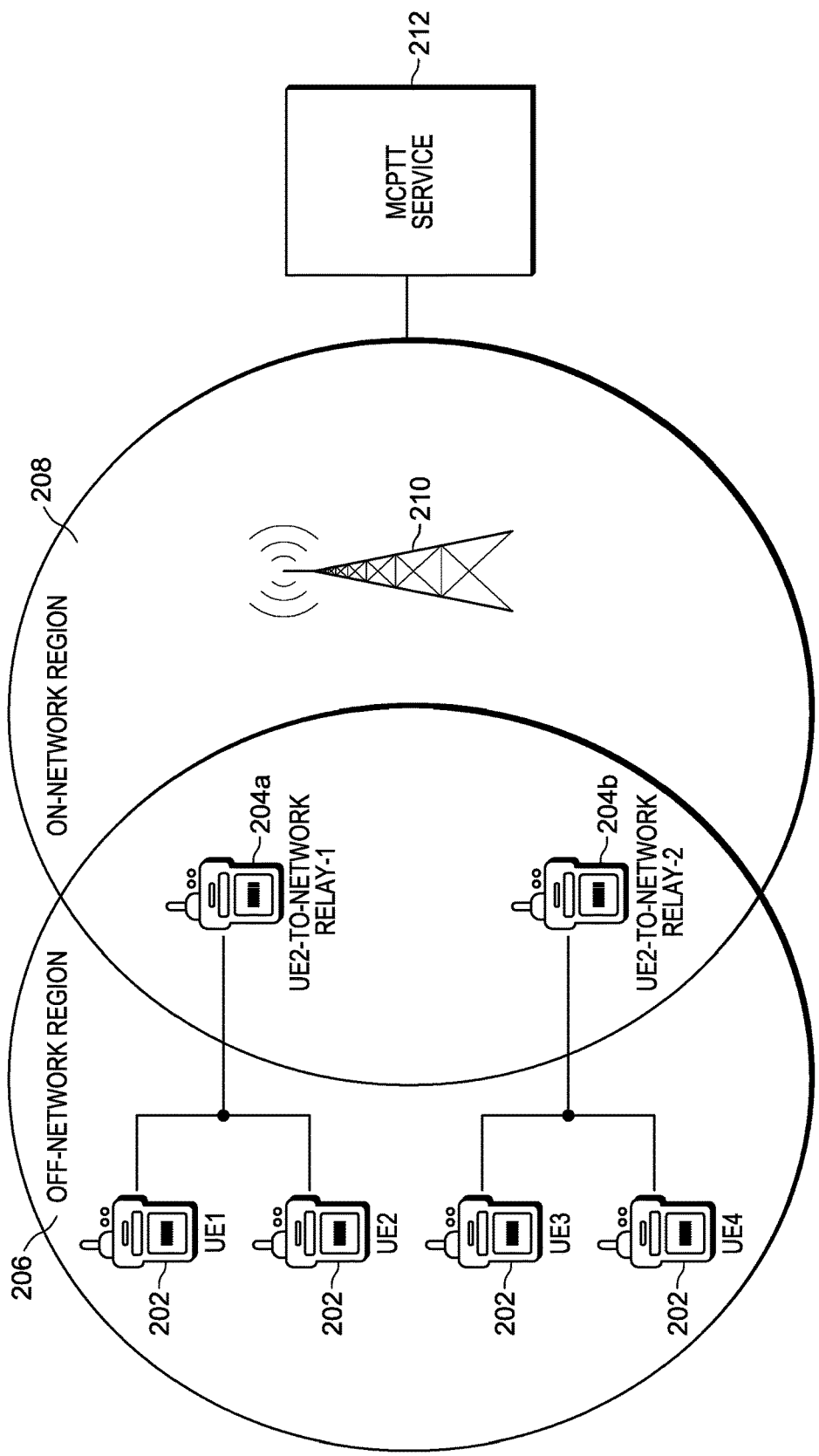
FIG. 2 is a block diagram of a communications system having a plurality of UE-to-Network relays in accordance with some embodiments.

FIG. 2 illustrates a block diagram of multiple UE-to-Network relays 204 (labeled 204a and 204b) in a region 206. The region 206 may correspond to a coverage area for communications with the UE-to-Network relays 204 using direct mode communications. Various embodiments may provide mechanism(s) to maximize (or at least improve) the number of users who can be served in off-network mode by enabling off-network UEs 202 in region 206 to be distributed among the available UE-to-Network relays 204. The off-network UEs 202 are located outside of a coverage area of a wireless communications network 210. In FIG. 2, the coverage area of the network 210 is illustrated as region 208. The off-network UEs 202 may be distributed among available UE-to-Network relays 204, which connect the off-network UEs 202 to network 210. Network 210 in turn connects the off-network UEs 202 to a PTT server of a PTT platform (e.g., as described above) for the off-network UEs 202 to access a PTT service 212.

Various embodiments include mechanism(s) for off-network UEs 202 to discover available UE-to-Network relays 204 within region 206. In some embodiments, the discovery of UE-to-Network relays 204 by off-network UEs 202 may be in accordance with the 3GPP ProSe standard but modified as described below to allow the off-network UEs 202 to determine load levels of the discovered relays 204. The UE-to-Network relays 204 may provide capacity indication(s) to each off-network UE 202 (e.g., during the discovery mechanism) regarding available capacity (e.g., load level) of a respective UE-to-Network relay 204. The capacity indication(s) may be in the form of a numeric indication specifying the number of additional connections the UE-to-Network relay 204 can accept; an indication of the bandwidth that is available for the traffic through the UE-to-Network relay 204, combinations thereof, or the like.

Once the available UE-to-Network relays 204 are discovered, various embodiments further provide mechanisms for the off-network UEs 202 in region 206 to be distributed among available UE-to-Network relays 204. For example, an off-network UE 202 may select an appropriate UE-to-Network relay 204 in accordance with a relay selection policy. The relay selection policy may be defined by a standard, a PTT service provider, an enterprise group the off-network UE 202 belongs to, or the like. The relay selection policy may instruct an off-network UE 202 to select a UE-to-Network relay 204 that is currently the least loaded. For example, the off-network UE 202 may determine the load level of each available UE-to-Network relay 204 using capacity indications provided by the UE-to-Network relays 204 (e.g., during discovery of the UE-to-Network relay 204) and select a least loaded UE-to-Network relay 204 to connect to. In some embodiments, the off-network UE 202 may report the number of alternate UE-to-Network relay(s) that the off-network UE 202 has discovered to the selected UE-to-Network relay (e.g., the UE-to-Network relay selected for making a network connection).

Various embodiments may further include one or more mechanisms for connection transfer of an off-network UE 202 from a first UE-to-Network relay (e.g., UE-to-Network relay 204a) to a second UE-to-Network relay (e.g., UE-to-Network relay 204b). Connection transfers may be performed for congestion mitigation (e.g., load balancing) among the UE-to-Network relays within a region (e.g., region 206). For example, when a first UE-to-Network relay 204a is facing traffic congestion, the first UE-to-Network 204a has the ability to direct an off-network UE 202 to transfer its connection to a second UE-to-Network relay 204b different from the first UE-to-Network relay 204a for load balancing.

In some embodiments, an off-network UE 202 may provide an indication to the first UE-to-Network relay 204a regarding alternate connection paths to the network 210 through other UE-to-Network relays (e.g., relay 204b) available to the off-network UE 202. The availability of alternate connection paths may be specific to each off-network UE 202. This information regarding alternate connection paths available to an off-network UE 202 may be used by the first UE-to-Network relay 204a to initiate connection transfer procedures without disrupting an off-network UE 202's connectivity to the network 210. The information regarding alternate connection paths to the network 210 may be provided in response to a query from the first UE-to-Network relay 204a regarding whether an off-network UE 202 has access to one or more alternate connection paths. In some embodiments, the query regarding alternate connection paths may be transmitted, by the UE-to-Network relay 204a, to an off-network UE 202 before initiating a connection transfer procedure for the off-network UE 202. Alternatively, the information regarding alternate connection paths may be provided to the UE-to-Network relay 204a at a different point in time (e.g., when the off-network UE 202 connects to the UE-to-Network relay 204a). In some embodiments, an off-network UE 202 may refuse a connection transfer request from a UE-to-Network relay 204 if the off-network UE 202 has no alternate connection path to the network 210. In such embodiments, the off-network UE 202 may not provide any indication regarding alternate connection paths prior to the connection transfer request.

In an embodiment, a first UE-to-Network relay (e.g., UE-to-Network relay 204a) may detect that it is facing traffic congestion and initiate a connection transfer procedure for one or more off-network UEs connected to the UE-to-Network relay in response to detecting a bandwidth usage by off-network UEs connected to the first UE-to-Network relay exceeding a threshold, a total number of off-network UEs connected to the first UE-to-Network relay exceeding a threshold, combinations thereof, or the like. In response to detecting traffic congestion, the first UE-to-Network relay may select an off-network UE 202 among off-network UEs (e.g., an off-network UE 202) connected to the first UE-to-Network relay for initiating the connection transfer procedure according to a UE transfer policy. In some embodiments, the UE transfer policy selects an off-network UE to transfer based on the off-network UE's bandwidth usage, connection age, user priority, type or amount of activity, number of UE-to-Network relays discovered by the off-Network UE for connection to the network, combinations thereof, or the like. The connection transfer procedure may further include the first UE-to-Network relay transmitting a message to the selected off-network UE, instructing the selected off-network UE to perform a UE-to-Network relay selection procedure. The UE-to-Network relay selection procedure may be similar to the procedure described above when an off-network UE selects an initial UE-to-Network relay for connection to the network. For example, the selected off-network UE discovers available UE-to-Network relays within its coverage area (e.g., an area where direct mode communications with the off-network UE is possible), the first off-network UE determines a load level of each of the available UE-to-Network relays in it coverage area (e.g., based on load indications transmitted by the relays), and the selected off-network UE selects a UE-to-Network relay in accordance with the load levels and a relay selection policy (e.g., the off-network UE may select a least loaded relay) for connection to the wireless communications network (e.g., network 210). In response to a different UE-to-Network relay (e.g., relay 202b) being selected by the off-network UE, the off-network UE initiates a connection to the different UE-to-Network relay. In response to successfully connecting to the different UE-to-Network relay, the off-network UE disconnects from the first UE-to-Network relay (e.g., relay 202a). The off-network UE may further update connection path information registered with PTT platform/the wireless communications network 210.

Alternatively, a controller of the network 210 (e.g., a PTT server providing PTT service 212) initiates connection transfer procedures among the off-network UEs connected to the network 210. For example, the controller may monitor a respective load level of UE-to-Network relays connected to network 210. UE-to-Network relays connected to network 210 may periodically perform a UE discovery procedure (e.g., to discover off-network UEs within a coverage area of a respective relay) and report discovered UEs to the controller. Further, off-network UEs connected to network 210 through UE-to-Network relays may register connection path information with the PTT platform/network 210, which identifies a specific UE-to-Network relay an off-network UE is connected to. Using the connection path information and the UE discovery information, the controller may determine whether an alternate and more suitable (e.g., less loaded) UE-to-Network relay is available to an off-network UE. In response to determining an alternate, more suitable UE-to-Network relay is available to the off-network UE, the controller initiates a connection transfer procedure for the off-network UE. The connection transfer procedure may include the controller transmitting a transfer instruction to the off-network UE instructing the off-network UE to attempt to discover and connect to the alternate UE-to-Network relay. In response to receiving the transfer instruction from the controller, the off-network UE attempts to discover and subsequently connect to the alternate UE-to-Network relay. In response to successfully connecting to the new UE-to-Network relay, the off-network UE disconnects from a UE-to-Network relay, which the off-network UE was initially connected to. The off-network UE may further update connection path information registered with PTT platform/the wireless communications network 210.

Figure 3A:
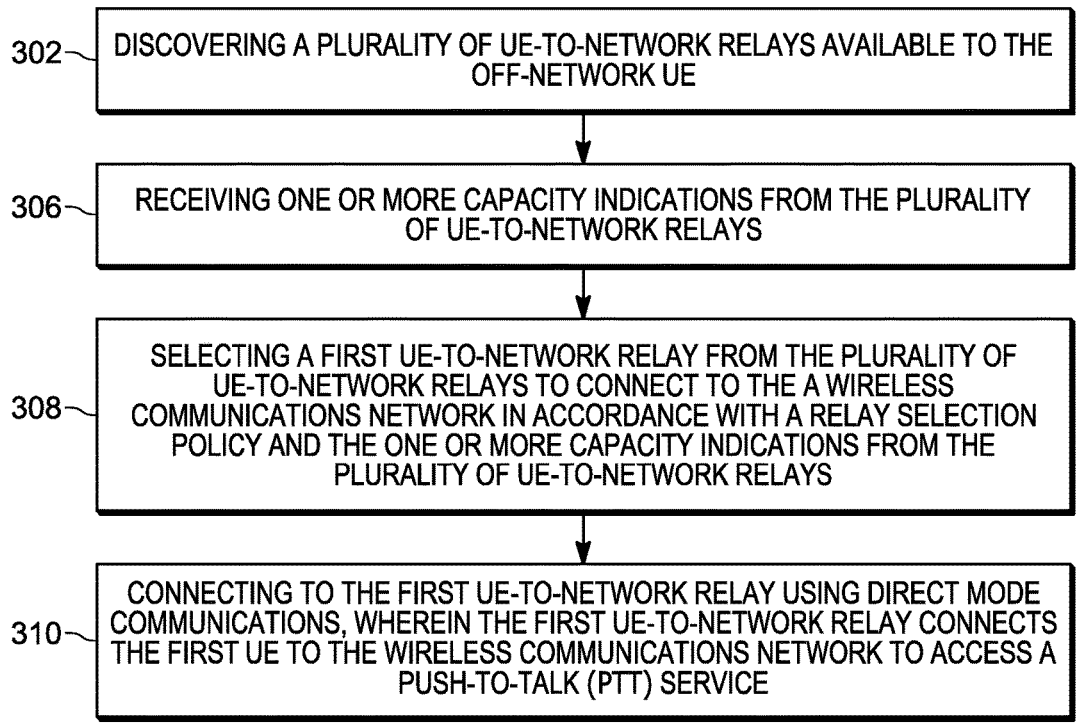
FIGS. 3A and 3B are flowcharts of a method of communicating in a system having a plurality of UE-to-Network relays in accordance with some embodiments.

FIG. 3A illustrates a flow chart of off-network UE (e.g., off-network UE 202) activity in accordance with some embodiments. In block 302, the off-network UE discovers a plurality of UE-to-Network relays (e.g., relays 204) available to the off-network UE. In block 304, the off-network UE receives one or more capacity indications from the plurality of UE-to-Network relays. A capacity indication may be received from each of the plurality of UEs and may indicate a number of additional off-network UE connections a respective UE-to-Network relay can accept, the available bandwidth for the traffic through the respective UE-to-Network relay to a network (e.g., network 210), combinations thereof, or the like. In block 306, the off-network UE selects a first UE-to-Network relay from the plurality of UE-to-Network relays to connect to a wireless communications network in accordance with a relay selection policy and the one or more capacity indications from the plurality of UE-to-Network relays. For example, the relay selection policy may direct the off-network UE to select a relay that is least loaded as determined using the one or more capacity indications (e.g., the relay with the greatest number of available off-network UE connections, the greatest amount of available bandwidth, or the like). In block 308, the off-network UE connects to the first UE-to-Network relay using direct mode communications. The first UE-to-Network relay connects the first UE to the wireless communications network for the off-network UE to access a PTT service.

Figure 3B:
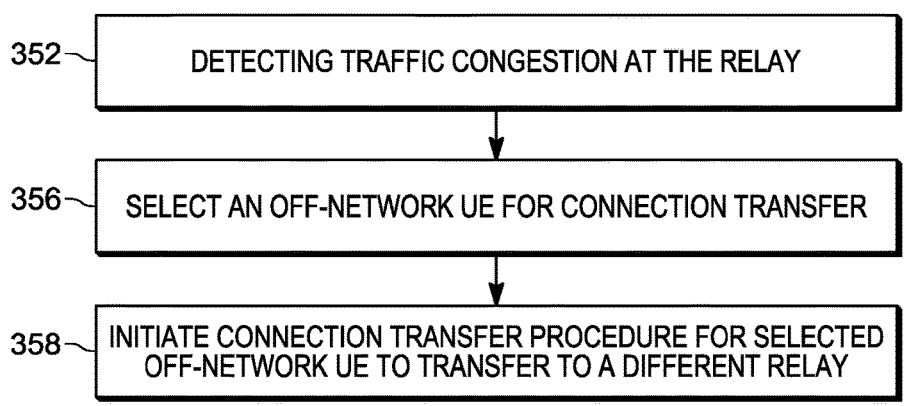

FIG. 3B illustrates a flow chart of UE-to-Network relay (e.g., relays 204) activity in accordance with some embodiments. In block 352, the UE-to-Network relay detects traffic congestion at the UE-to-Network relay. In block 354, in response to detecting the traffic congestion, the UE-to-Network relay selects an off-network UE (e.g., off-network UE 202) connected to the UE-to-Network relay for a connection transfer procedure. The connection transfer procedure may instruct the off-network UE to transfer connection from the UE-to-Network relay to a different UE-to-Network relay available to the off-network UE so that the off-network UE can continue to access a network. The off-network UE may be selected based on the off-network UE's bandwidth usage, connection age, user priority, type or amount of activity, combinations thereof, or the like. The off-network UE may further be selected based on the availability for the off-network UE to establish a connection path to the network through an alternate UE-to-Network relay. In block 356, the UE-to-Network relay initiates a connection transfer procedure for the selected off-network UE to transfer to a different UE-to-Network relay.

Figure 4:
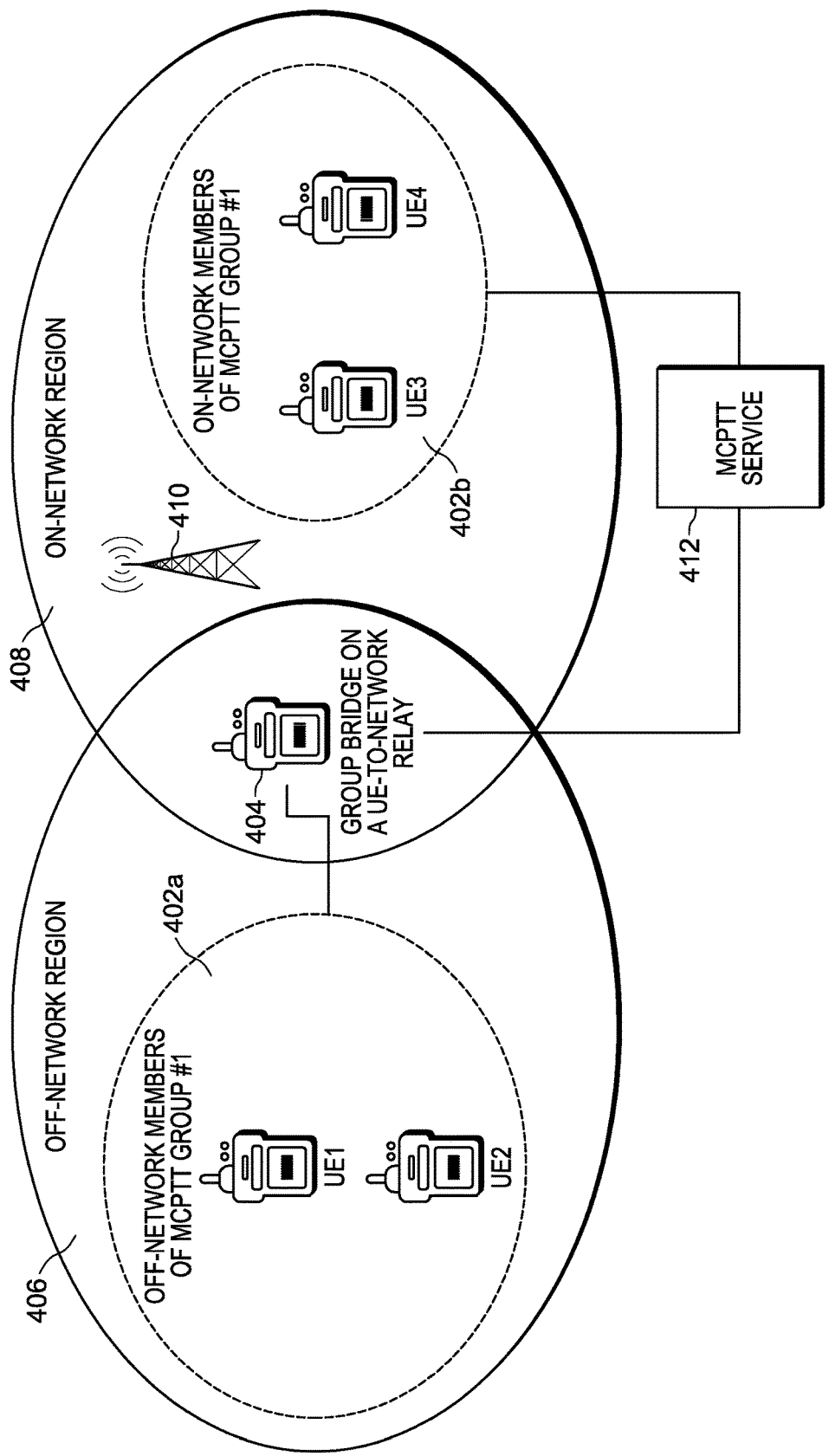
FIGS. 4 and 5 are block diagrams of communications systems using group communications with relays in accordance with some embodiments.

FIG. 4 illustrates a block diagram of an embodiment group communications (e.g., using a group bridge) with a UE-to-Network relay 404 to provide a PTT service 412 when several off-network UEs (e.g., off-network UEs 402a) access the PTT service 412 (e.g., a MCPTT service) through a UE-to-Network relay 404 in a region 406. For example, the UE-to-Network relays 404 connects the off-network UEs 402a to network 410, and network 410 in turn connects the off-network UEs 402a to a PTT server of a PTT platform (e.g., as described above) so that the off-network UEs 402a can access PTT service 412 (e.g., a PTT group communications session with one or more on-network UEs 402b). At least a portion of region 406 is an off-network region where network coverage (e.g., Evolved Multimedia Broadcast Multicast Services (eMBMS) service) is not available. In some embodiments, the region 406 may correspond to a coverage area for communications with the UE-to-Network relay 404 over direct mode communications. The off-network UEs 402a are located in the off-network portion of region 406, and the off-network UEs 402a may participate in the group communication using unicast media flow conveyed through the UE-to-Network relay 404. However, this results in multiple, duplicate streams of the same media flowing through the UE-to-Network relay 404. The number of same media streams may be equivalent to the number of separate unicast media streams sent to each of the off-network UEs 402a that is participating in the group communication. This may limit the number of off-network UEs 402a that may participate in the group communication through a UE-to-Network relay 404 due to the finite nature of network resources (e.g., available bandwidth through UE-to-Network relay 404).

Various embodiments may improve group communication between off-network UEs 402a and on-network UEs 402b participating in PTT service 412. In some embodiments, off-network UEs 402a participate in an off-network group communications session using a multicast based off-network group call protocol over proximity based services (ProSe). The UE-to-Network relay 404 is also included in the off-network group communications session with the off-network UEs 402a. For example, the UE-to-Network relay 404 may participate in the multicast based off-network group communication flows. In some embodiments, UE-to-Network relay 404 performs a role similar to a non-controlling PTT function. For example, the UE-to-Network relay 404 may establish a group call session with a controlling PTT function on a PTT server in network 410 providing PTT service 412. The group call session may further be provided by the PTT server in network 410 to the on-network UEs 402b. The UE-to-Network relay 404 bridges the group of off-network UEs 402a with a corresponding group of on-network UEs 402b, and the UE-to-Network relay 404 is responsible for conveying signaling and media flows between the off-network UEs 402a and on-network UEs 402b participating in the PTT service. In some embodiments, a single signaling/media stream is sent to the off-network UEs 402a by the UE-to-Network relay 404 without duplicating any signaling or media streams for individual off-network UEs 402a. By transmitting a single multicast stream to multiple off-network UEs in lieu of multiple unicast streams, network resources can be saved and more off-network UEs 402a can be served by a single UE-to-Network relay 404.

Figure 5:
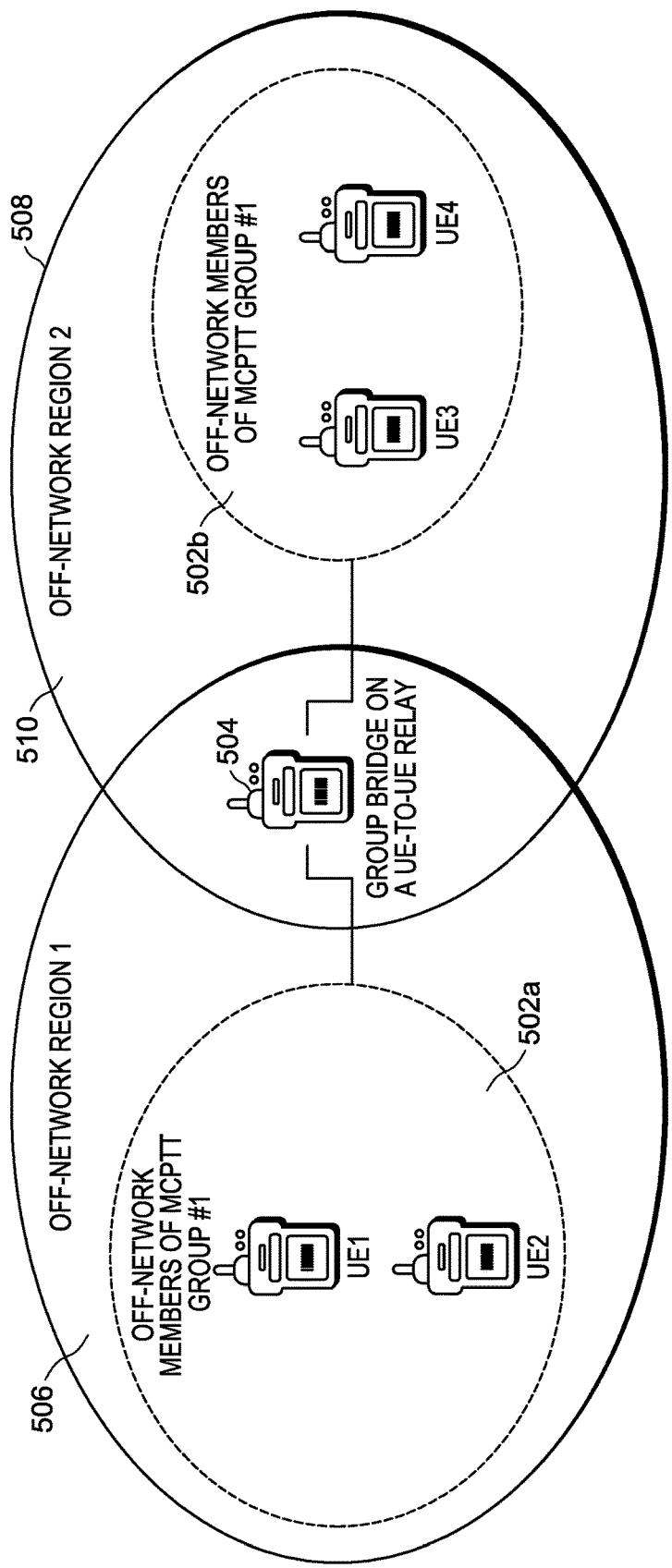

FIG. 5 illustrates a block diagram of group communications (e.g., using a group bridge) with a UE-to-UE relay 504 to provide a PTT service (e.g., a PTT service as described above)) between a first group of off-network UEs 502a and a second group of off-network UEs 502b. Group bridge functionality of the UE-to-UE relay 504 is similar to the group bridge functionality of the UE-to-Network relay 404 that is described in above with respect to FIG. 4. Further, the UE-to-UE relay 504 may provide a controlling PTT function for the PTT service provided to off-network UEs 502a and 502b. For example, the UE-to-UE relay 504 may set up a PTT call and arbitrate floor control during the PTT call between the off-network UEs 502a and 502b. In the embodiment of FIG. 5, group bridge functionality may be used to connect off-network UEs in two separate and overlapping off-network regions 506 and 508. Regions 506 and 508 may be regions where network coverage (e.g., Evolved Multimedia Broadcast Multicast Services (eMBMS) service) is not available. Region 506 may correspond to a coverage area of group communications using direct mode communications among the first group of off-network UEs 502a, and region 508 may correspond to a coverage area of group communications using direct mode communications among the second group of off-network UEs 502b.

The off-network UEs in each region 506 and 508 participate in a group communications session using a multicast based off-network group call protocol over ProSe within their respective regions. For example, off-network UEs 502a participate in a first group communications session using a multicast based off-network group call protocol over ProSe in region 506, and off-network UEs 502b participate in a second group communications session using a multicast based off-network group call protocol over ProSe in region 508. UE-to-UE relay 504 is located in an overlapping area of regions 506 and 508, and UE-to-UE relay 504 participates in multicast based group communications sessions in both regions 506 and 508. For example, the UE-to-UE relay 504 participates in both the first group communications session with off-network UEs 502a as well as the second group communications session with off-network UEs 502b. The UE-to-UE relay 504 may convey signaling and media flows between the participants (e.g., the off-network UEs 502a and 502b) of the first and second group communications sessions in respective regions 506 and 508. In some embodiments, a single signaling/media stream is sent to the off-network UEs 502a by the UE-to-UE relay 504 without duplicating any signaling or media streams for individual off-network UEs 502a. Similarly, a single signaling/media stream is sent to the off-network UEs 502b by the UE-to-UE relay 504 without duplicating any signaling or media streams for individual off-network UEs 502b. By transmitting a single multicast stream to multiple off-network UEs 502a/502b in lieu of multiple unicast streams, network resources can be saved and more off-network UEs 502a/502b can be served by a single UE-to-UE relay 504.

Figure 6:
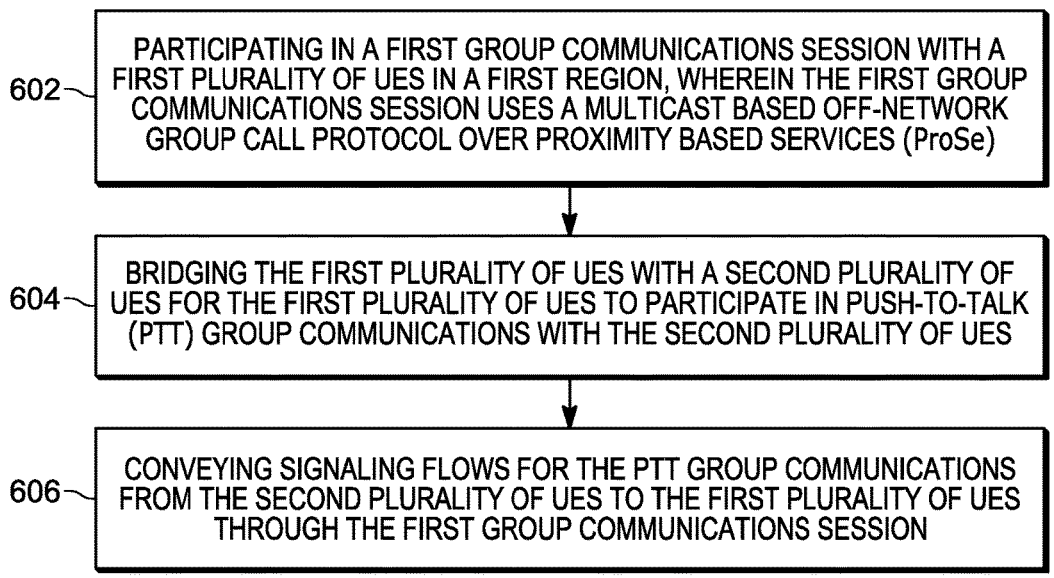
FIG. 6 is a flow chart of a method of group communications using relays in accordance with some embodiments.

FIG. 6 illustrates a flow chart of relay (e.g., UE-to-Network relay 404 or UE-to-UE relay 504) activity in accordance with some embodiments. In block 602, the relay participates in a first group communications session with a first plurality of UEs (e.g., off-network UEs 402a or 502a) in a first region (e.g., region 406 or 506). The first group communications session uses a multicast based off-network group call protocol over ProSe. The relay can be a UE-to-Network relay, such as relay 404, described with respect to FIG. 4 or a UE-to-UE relay, such as relay 504, described with respect to FIG. 5. In block 604, the relay bridges the first plurality of UEs with a second plurality of UEs (e.g., on-network UEs 402b or off-network UEs 502b) for the first plurality of UEs to participate in a PTT service (e.g., PTT group communications) with the second plurality of UEs. The second plurality of UEs is located in a second region (e.g., region 408 or 508) different from the first region. The second region can be an on-network region (e.g., within a coverage area of a wireless communications network) or an off-network region (e.g., outside a coverage area of any wireless communications networks). In some embodiments, the second plurality of UEs are on-network UEs; the PTT service is provided through a PTT server connected to a wireless communications network; and the relay bridges the first plurality of UEs with the wireless communications network. In such embodiments, the first plurality of UEs accesses the PTT service provided by the PTT server. In other embodiments, the second plurality of UEs includes off-network UEs, and the relay participates in a second group communications session with the second plurality of UEs. In such embodiments, the second group communications session uses a multicast based off-network group call protocol over ProSe. In block 606, the relay conveys signaling flows for the PTT service from the second plurality of UEs to the first plurality of UEs through the first group communications session (e.g., using a multicast based off-network group call protocol over ProSe).

Figure 7:
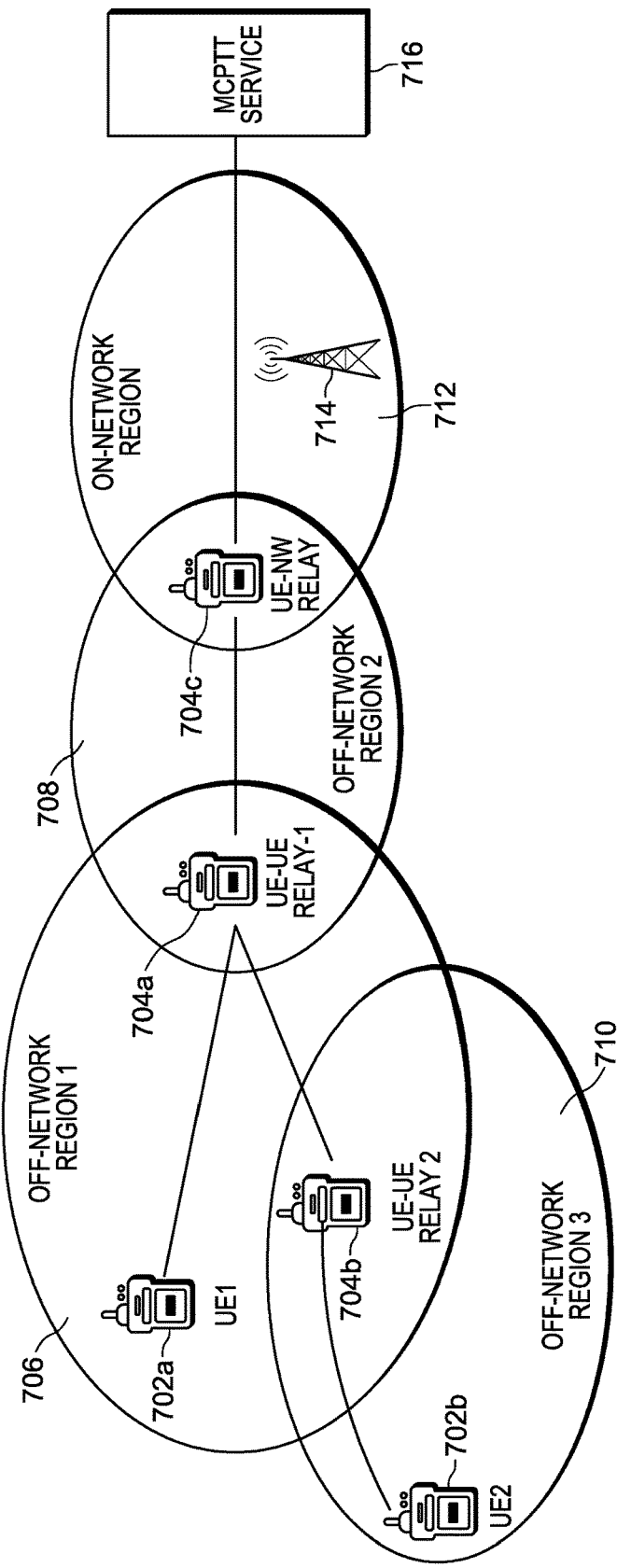
FIGS. 7 and 8 are block diagrams of communications systems using multi-hop relays in accordance with some embodiments.

FIG. 7 illustrates a block diagram of range extension using multi-hop UE-to-UE relays in accordance with some embodiments. Off-network UEs 702a and 702b in off-network regions 706 and 710 are not located in the coverage range (illustrated as region 708) of a UE-to-Network relay (e.g., relay 704c). The coverage range of UE-to-Network relay 704c may correspond to a coverage area of communications with UE-to-Network relay 704c using direct mode communications. Various embodiments allow the off-network UEs 702a/702b to communicate with the UE-to-Network relay 704c through one or more UE-to-UE relays 704a and/or 704b. For example, off-network UE 702a is connected to a UE-to-Network Relay 704c through a first UE-to-UE relay 704a. It may also be possible for an off-network UE to connect to a UE-to-Network relay through a chain of UE-to-UE relays. For example, off-network UE 702b is connected to the UE-to-Network relay 704c through the first UE-to-UE relay 704a in combination with a second UE-to-UE relay 704b. Specifically, the off-network UE 702b is connected to the first UE-to-UE relay 704a through the second UE-to-UE relay 704b. The UE-to-Network relay 704c connects off-network UEs 702a/702b to network 714. Network 714 in turn connects the off-network UEs 702a/702g to a PTT server of a PTT platform (e.g., as described above) so that the off-network UEs 702a/702g can access a PTT service 716. In FIG. 7, a coverage area of network 714 is illustrated as region 712.

Embodiment mechanism(s) may be used to connect an off-network UE 702a/702g to a UE-to-Network relay 704c indirectly through one or more UE-to-UE relays 704a and/or 704b as described below. A UE-to-UE relay 704a/704b may discover UE-to-Network relays within its coverage range. When a UE-to-UE relay 704a/704b is discovered by an off-network UE 702a/702b, the discovered UE-to-UE relay 704a/704b advertises the availability of direct connectivity to a UE-to-Network relay in the UE-to-UE relay's coverage range to the off-network UE. For example, UE-to-UE relay 704a may advertise the availability of direct connectivity with UE-to-Network relay 704c to off-network UEs (e.g., UE 702a) and/or other UE-to-UE relays (e.g., relay 704b) in a coverage range of UE-to-UE relay 704a. The coverage range of UE-to-UE relay 704a may correspond to a coverage area of communications with UE-to-UE relay 704a using direct mode communications.

When a UE-to-UE relay finds that there are no UE-to-Network relays within its coverage range, the UE-to-UE relay may try to discover other UE-to-UE relays having connectivity to a UE-to-Network relay either directly or indirectly through additional UE-to-UE relays. For example, upon detection that there are no UE-to-Network relays within a coverage range of UE-to-UE relay 704b, UE-to-UE relay 704b may try to discover other UE-to-UE relays (e.g., relay 704a) having connectivity to UE-to-Network relay 704c. The coverage range of UE-to-UE relay 704b may correspond to a coverage area of communications with UE-to-UE relay 704b using direct mode communications.

Upon discovering the availability of indirect connectivity to a UE-to-Network relay 704c through another UE-to-UE relay 704a, the UE-to-UE relay 704b may advertise the availability of indirect connectivity to a UE-to-Network relay to off-network UE and/or other UE-to-UE relays attempting to discover a connectivity path to a network within its coverage area. When advertising direct or indirect connectivity to the UE-to-Network relay 704c, a UE-to-UE relay 704a/704b may provide an indication of the number of hops (e.g., the number of UE-to-UE relays) needed to reach a UE-to-Network relay 704c.

When an off-network UE is unable to connect to a UE-to-Network relay directly, the off-network UE may try to discover UE-to-UE relays that are directly or indirectly connected to a UE-to-Network relay. For example, the off-network UE 702a discovers UE-to-UE relays within its coverage range (e.g., illustrated as region 706), and the off-network UE 702b discovers UE-to-UE relays within its coverage range (e.g., illustrated as region 710). Region 706 corresponds to a coverage area of communications with off-network UE 702a through direct mode communications, and region 710 corresponds to a coverage area of communications with off-network UE 702b through direct mode communications. An off-network UE may choose an UE-to-UE relay for connection depending on the number of hops to a UE-to-Network relay through the available UE-to-UE relays. For example, although both UE-to-UE relays 704a and 704b are within a coverage range (e.g., region 706) of off-network UE 702a, off-network UE 702a selects UE-to-UE relay 704a to connect to network 714 because there are fewer hops to network 714 through UE-to-UE relay 704a than through UE-to-UE relay 704b. Furthermore, when multiple UE-to-Network relays are present in a region, a connection transfer mechanism described above with respect to FIG. 2 may be applied for congestion mitigation. Similarly, when multiple UE-to-UE relays are present in a region connected to a UE-to-Network relay, UE connection may be transferred between the UE-to-UE relays to mitigate congestion on a particular UE-to-UE relay.

Figure 8:
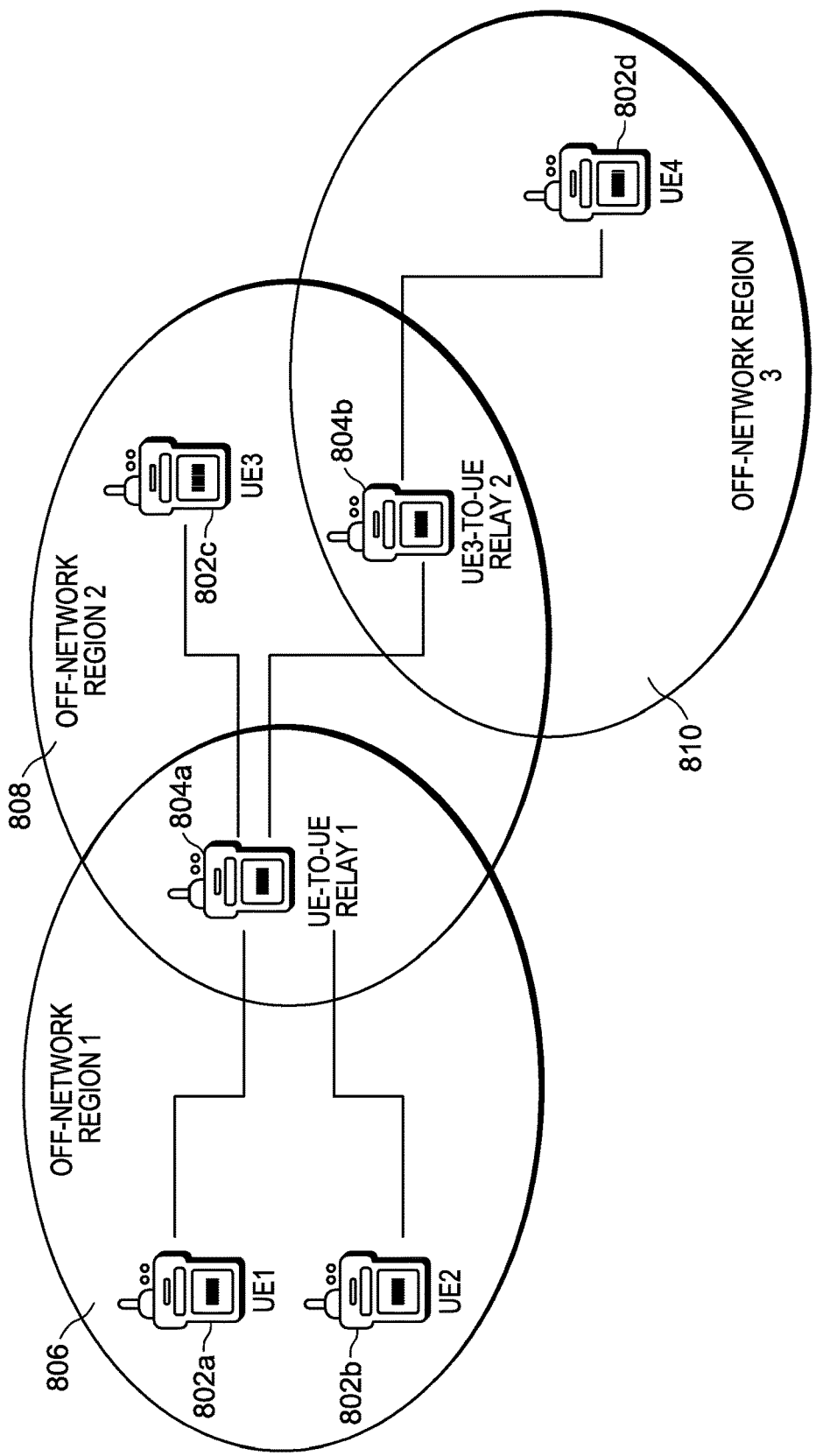

FIG. 8 illustrates a block diagram of UE-to-UE communications through one or more UE-to-UE relays. A UE-to-UE relay may be used to enable communication between off-network UEs spread across disjointed regions. For example, off-network UEs 802a, 802b, 802c, and 802d are disposed in three different off-network regions 806, 808, and 810, and off-network UEs 802a, 802b, 802c, and 802d are engaged in group communications using UE-to-UE relay 804a and UE-to-UE relay 804b over direct mode communications. A UE-to-UE relay may connect an off-network UE directly to another off-network UE. For example, UE-to-UE relay 804a connects off-network UE 802a/802b directly to off-network UE 802c. It is also possible to chain multiple UE-to-UE relays to extend the connection range of off-network UEs. For example, UE 802a is connected to 802d by a combination of the UE-to-UE relay 804a and the UE-to-UE relay 804b.

A challenge to UE-to-UE communication through multiple UE-to-UE relays is discovery of peer UEs which are out of the direct proximity range of a UE and the identification of an optimal routing path to reach peer UEs across one or more UE-to-UE relays. Peer UE detection and routing path identification may be achieved using the following dynamic route discovery mechanism(s). When a first off-network UE initiates a ProSe direct discovery procedure to discover a second off-network UE, UE-to-UE relays in the first UE's proximity zone relay the UE discovery request across respective proximity zones of each of the UE-to-UE relays. For example, when off-network UE 802a initiates a ProSe direct discovery procedure for off-network UE 802c or 802d, UE-to-UE relay 804a in off-network UE 802a's proximity zone (illustrated as region 806) forwards the UE discovery request across a proximity zone (illustrated as region 808) of UE-to-UE relay 804a. Region 806 may correspond to a coverage area (also referred to as proximity zone) of communications with off-network UE 802a over direct mode communications, and region 808 may correspond to a coverage area of communications with UE-to-UE relay 804a over direct mode communications. The forwarded UE discovery request may be received by an additional UE-to-UE relay (e.g., outside of the proximity zone of the first UE) and may be further forwarded by the additional UE-to-UE relay, thereby extending the range of the UE discovery request. For, example, UE-to-UE relay 804*b* receives a forwarded discovery request from UE-to-UE relay 804*a* indicating that off-network UE 802*a* is seeking off-network UE 802*c* or 802*d*. In this manner, the target UE (the second UE) may eventually be discovered and a communication path established between the requesting UE (the first UE) and the target UE (the second UE).

A UE-to-UE relay (e.g., relays 804*a*/804*b*) may keep track of all UEs that are directly or indirectly reachable through the UE-to-UE relay. For example, once a UE-to-UE relay discovers an off-network UE, the UE-to-UE relay may store connection path information for connection the off-network UE. On receiving a UE discovery request corresponding to a previously discovered UE, the UE-to-UE relay must respond with a connection path to the target UE and may not forward the UE discovery request any further. When forwarding a UE discovery request, a UE-to-UE relay (e.g., relays 804*a*/804*b*) may indicate how many UE-to-UE relays the UE discovery request has already passed through, including itself. The maximum length of a connection path (e.g., in terms of number of UE-to-UE relay hops) for a UE-to-UE communication may be limited by configuration (e.g., as defined by an administrator and/or a standard). A UE-to-UE relay receiving a forwarded UE discovery request may decide not to process the UE discovery request when the UE discovery request has already exceeded the maximum length of a connection path (e.g., the maximum number of UE-to-UE relay hops). This will have a damping effect on the UE discovery request traffic and cause the discovery requests for UEs not in range to eventually be dropped.

Figure 9:
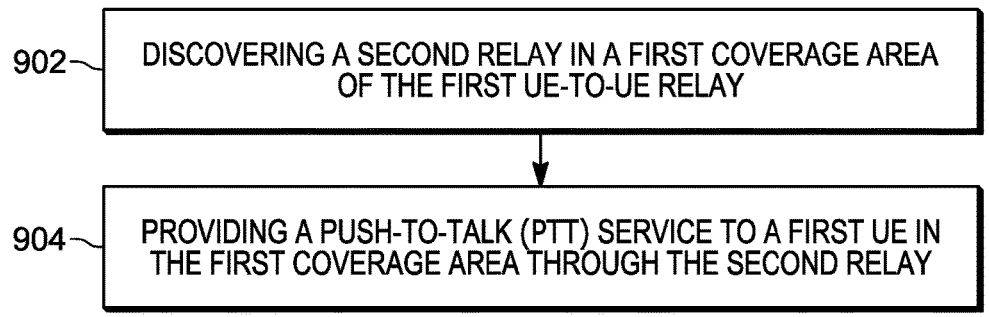
FIG. 9 is a flow chart of a method of communicating using multi-hop relays in accordance with some embodiments.

FIG. 9 illustrates a flow chart of UE-to-UE relay (e.g., UE-to-UE relay 704*a*/704*b* or 804*a*) activity in accordance with some embodiments. In block 902, the UE-to-UE relay discovers a second relay in a first coverage area of the UE-to-UE relay. The second relay may be a UE-to-Network relay, such as relay 704*c* described above with respect to FIG. 7, or the second relay may be a UE-to-UE relay, such as relay 704*a* described above with respect to FIG. 7 or relay 804*b* described above with respect to FIG. 8. The first coverage area of the UE-to-UE relay corresponds to a coverage range of direct mode communications with the first UE-to-UE relay.

In block 904, the UE-to-UE relay provides a PTT service to a first UE (e.g., off-network UE 702*a*, 702*b*, 802*a*, 802*b*, or 802*c*) through the second relay. The first UE is connected to the UE-to-UE relay using direct mode communications, and the PTT service includes a communications session between the first UE and a second UE located outside the first coverage area. In some embodiment, the second UE may be an on-network UE when the second relay is an UE-to-Network relay. In such embodiments, the second relay connects the first UE to a wireless communications network, which in turn connects the first UE and the second UE to a PTT server of a PTT platform so that the first UE and the second UE can participate in a PTT service provided by the PTT platform. In such embodiments, the UE-to-UE relay may further advertise the availability of a connection to the PTT server through the UE-to-UE relay and the second UE. Advertising the availability of connectivity may include indicating a number of hops (e.g., the total number of relays) between the UE-to-UE relay and the network (e.g., the PTT server).

In other embodiments, the second UE is an off-network UE (e.g., off-network UEs 802*c* or 802), which is located in a different off-network region than the first UE. In such embodiments, the UE-to-UE relay may receive a discovery request from the first UE seeking the second UE. The UE-to-UE relay may forward the discovery request to the second relay. Alternatively, the UE-to-UE relay may have previously detected and stored a connectivity path from the UE-to-UE relay to the second UE prior to receiving the discovery request. In such embodiments, the UE-to-UE relay may respond to the discovery request by transmitting the stored connectivity path to the first UE without forwarding the discovery request to the second relay.

Various embodiments may further support concurrent usage of direct mode and on-network mode communications. In various embodiments, a PTT client device typically switches to direct mode communication (e.g., using UE-to-UE communications as described above) when the PTT client device loses connectivity with a mobile radio network. However, it is possible for the direct mode communication to be used concurrently with an on-network communication mode. This is especially useful for reducing the load on the network elements by off-loading group communication traffic from the network when multicast/broadcast (e.g., eMBMS) communication is not setup for the group. In this concurrent usage mode, the client devices may use direct mode communication for groups where all member UEs are within proximity range (e.g., within a region or within a certain number of UE-to-UE hops) of each other and use on-network mode for other types of communications (e.g., the communication occurring on more dispersed groups). The decision to switch to direct mode communication for a group may be autonomously made by the UEs or may be induced by network. For example, a network induced method may be triggered when the network detects that all the member UEs of a group are within proximity range of each other. In such embodiments, a PTT server may instruct all the UEs of the group to switch to direct mode communication for that group. As another example, an autonomous method may be triggered when a PTT UE belonging to a group discovers that all other UEs of that group are within its proximity range using ProSe direct discovery. The PTT UE may initiate a consensus procedure and requests all the UEs to switch to direct mode communications for the group. Each of the other UEs may then individually make a determination of whether all the UEs belonging to the group are within the proximity range from their respective perspectives. When all the UEs make the same determination that all other UEs are within proximity range, a consensus is deemed to have been achieved and all the UEs may switch to direct mode communication for the group.

Figure 10:
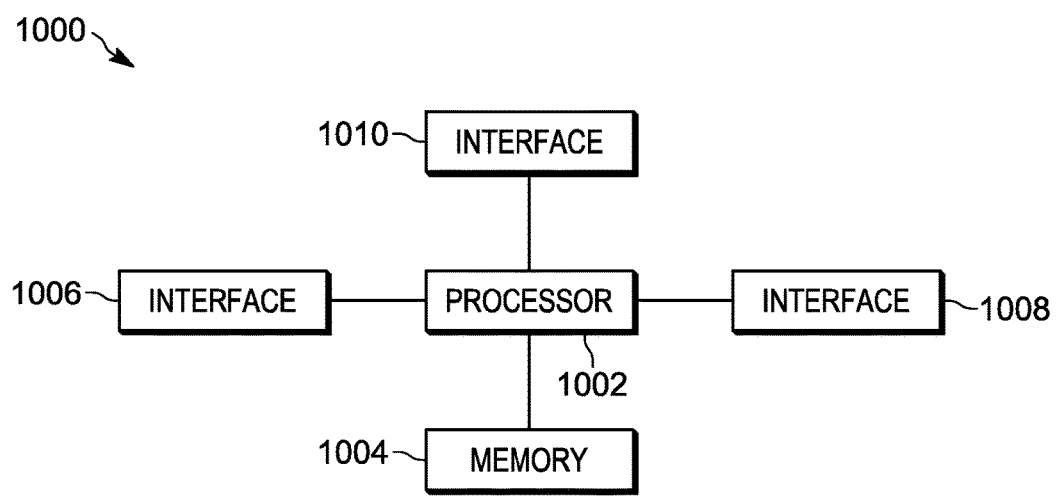
FIG. 10 is a block diagram of a processing system in accordance with some embodiments.

FIG. 10 illustrates a block diagram of an embodiment processing system 1000 for performing methods described herein, which may be installed in a host device. As shown, the processing system 1000 includes an electronic processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long-term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
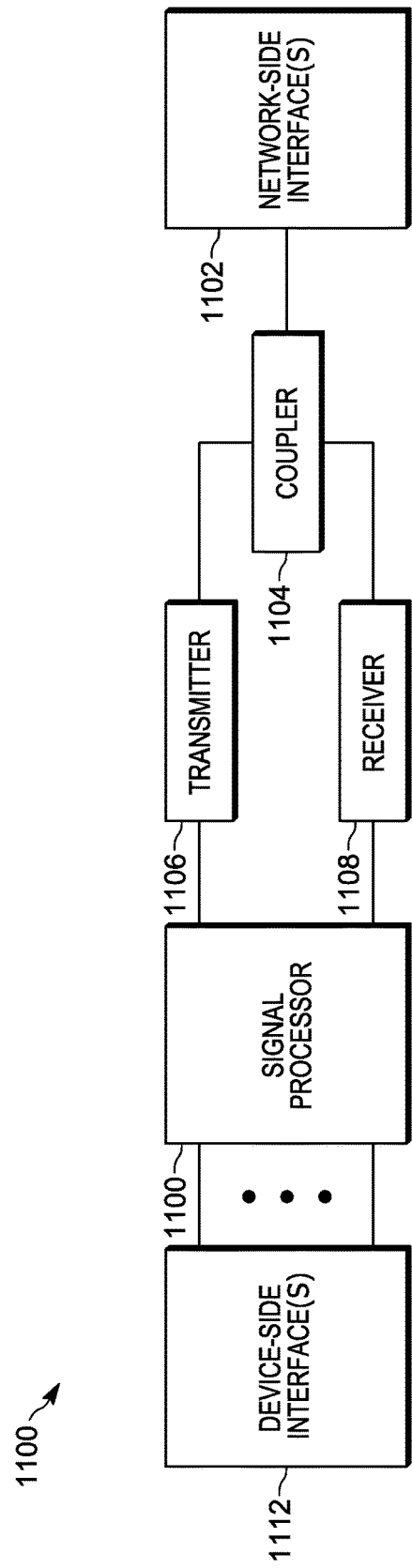
FIG. 11 is a block diagram of a transceiver in accordance with some embodiments.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
discovering, by a first user equipment (UE), a plurality of UE-to-Network relays available to the first UE, wherein the first UE is located outside a coverage area of a wireless communications network;
receiving, by the first UE, one or more capacity indications from the plurality of UE-to-Network relays;
selecting, by the first UE, a first UE-to-Network relay from the plurality of UE-to-Network relays to connect to the wireless communications network in accordance with a relay selection policy and the one or more capacity indications, wherein the one or more capacity indications indicates a number of additional connections the first UE-to-Network relay can accept, an indication of bandwidth available through the first UE-to-Network relay, or a combination thereof; and
connecting, by the first UE, to the first UE-to-Network relay using direct mode communications, wherein the first UE-to-Network relay connects the first UE to the wireless communications network for the first UE to access a Push-to-talk (PTT) service.

2. The method of claim 1, wherein the relay selection policy instructs the first UE to select a least loaded UE-to-Network relay of the plurality of UE-to-Network relays for the first UE to connect to the wireless communications network, and wherein the method further comprises, determining, by the first UE, a load level of each of the plurality of UE-to-Network relays using the one or more capacity indications.

3. The method of claim 1 further comprising receiving, by the first UE, a connection transfer request requesting the first UE to transfer to a second UE-to-Network relay of the plurality of UE-to-Network relays for connection to the wireless communication network, wherein the first UE is selected for connection transfer from a plurality of UE connected the first UE-to-Network relay in accordance with a bandwidth usage of the first UE, a connection age of the first UE, user priority of each of the plurality of UE, activity type of the first UE, number of UE-to-Network relays discovered by the first UE for connection to the wireless communications network, or a combination thereof.

4. The method of claim 3, wherein the connection transfer request is transmitted by the first UE-to-Network relay, and wherein the method further comprises in response to receiving the connection transfer request, selecting, by the first UE, the second UE-to-Network relay from the plurality of UE-to-Network relays to connect to the wireless communications network in accordance with the relay selection policy.

5. The method of claim 3 further comprising transmitting, by the first UE, an indication of alternate access paths to the wireless communications network through the plurality of UE-to-Network relays to the first UE-to-Network relay.

6. The method of claim 1, further comprising receiving, by the first UE, a connection transfer request requesting the first UE to transfer to a second UE-to-Network relay of the plurality of UE-to-Network relays for connection to the wireless communication network, wherein the connection transfer request is transmitted by a controller of the wireless communications network, and wherein the connection transfer request identifies the second UE-to-Network relay.

7. A method comprising:
participating, by a relay, in a first group communications session with a first plurality of UEs in a first region, wherein the first group communications session uses a multicast based off-network group call protocol over proximity based services (ProSe);
bridging, by the relay, the first plurality of UEs with a second UE for the first plurality of UEs to participate in Push-to-Talk (PTT) group communications with the second UE, wherein the second UE is located in a second region different from the first region; and
conveying, by the relay, signaling flows for the PTT group communications from the second UE to the first plurality of UEs through the first group communications session.

8. The method of claim 7, wherein the first region is an off-network region.

9. The method of claim 7, wherein the second region is an on-network region of a wireless communications network, wherein the PTT group communications are established through a controlling PTT function on a PTT server, and wherein the second UE is connected to the PTT server through the wireless communications network.

10. The method of claim 7, and wherein the second region is an off-network region.

11. The method of claim 10, further comprising participating, by the relay, in a second group communications session with a second plurality of UEs, wherein the second UE is one of the second plurality of UEs, wherein the second group communications session uses a multicast based off-network group call protocol over ProSe, and wherein the relay arbitrates floor control between the first plurality of UEs and the second plurality of UEs.

12. The method of claim 7, wherein conveying, by the relay, the signaling flows for the PTT group communications comprises not duplicating, by the relay, the signaling flows for any of the first plurality of UEs.

13. A method comprising:
discovering, by a first user equipment (UE)-to-UE relay, a second relay in a first coverage area of the first UE-to-UE relay, wherein the first coverage area corresponds to a coverage range of direct mode communications with the first UE-to-UE relay; and
providing, by the first UE-to-UE relay, a Push-to-Talk (PTT) service to a first UE in the first coverage area through the second relay, wherein the first UE is connected to first UE-to-UE relay using direct mode communications, wherein the PTT service comprises a communications session between the first UE and a second UE, and wherein the second UE is located outside of the first coverage area.

14. The method of claim 13, wherein the PTT service is provided through a PTT server in a wireless communications network, and wherein the second UE accesses the PTT service through the PTT server over the wireless communications network.

15. The method of claim 14 further comprising advertising, by the first UE-to-UE relay, availability of connectivity to the PTT server through the first UE-to-UE relay and the second relay.

16. The method of claim 15, wherein advertising, by the first UE-to-UE relay, the availability of connectivity to the PTT server through the first UE-to-UE relay and the second relay comprises indicating a number of hops between the first UE-to-UE relay and the PTT server.

17. The method of claim 13, wherein the second UE is an off-network UE, and wherein each connection for the PTT service between the first UE and the second UE is provided over direct mode communications.

18. The method of claim 13 further comprising:
receiving, by the first UE-to-UE relay, a discovery request from the first UE seeking the second UE; and
forwarding, by the first UE-to-UE relay, the discovery request to the second relay.

19. The method of claim 13 further comprising:
receiving, by the first UE-to-UE relay, a discovery request from the first UE seeking the second UE;
prior to receiving the discovery request, detecting, by the first UE-to-UE relay, a connectivity path from the first UE-to-UE relay to the second UE;
storing, by the first UE-to-UE relay, the connectivity path; and
in response to receiving the discovery request, transmitting the connectivity path to the first UE and not forwarding the discovery request.

* * * * *